(12) United States Patent
Collins, I

(10) Patent No.: US 11,466,846 B1
(45) Date of Patent: Oct. 11, 2022

(54) EMERGENCY LIGHTING SYSTEM

(71) Applicant: Caleb C. Collins, I, Alabaster, AL (US)

(72) Inventor: Caleb C. Collins, I, Alabaster, AL (US)

( * ) Notice: Subject to any disclaimer, the term of this patent is extended or adjusted under 35 U.S.C. 154(b) by 0 days.

(21) Appl. No.: 17/140,024

(22) Filed: Jan. 1, 2021

(51) Int. Cl.
| | | |
|---|---|---|
| F21V 23/00 | (2015.01) | |
| F21V 23/04 | (2006.01) | |
| G01C 21/20 | (2006.01) | |
| F21Y 115/10 | (2016.01) | |
| F21Y 113/10 | (2016.01) | |

(52) U.S. Cl.
CPC ........ F21V 23/0442 (2013.01); G01C 21/206 (2013.01); *F21Y 2113/10* (2016.08); *F21Y 2115/10* (2016.08)

(58) Field of Classification Search
CPC .......................... G01C 21/206; F21V 23/0442
See application file for complete search history.

(56) References Cited

U.S. PATENT DOCUMENTS

| | | | | |
|---|---|---|---|---|
| 7,255,454 B2 * | 8/2007 | Peterson | ................ | F21S 8/032 362/147 |
| 9,955,318 B1 * | 4/2018 | Scheper | .................. | H04W 4/38 |
| 9,958,277 B1 * | 5/2018 | Espy | .................... | G01C 21/206 |
| 2009/0066522 A1 * | 3/2009 | Lee | .......................... | G08B 5/36 340/577 |
| 2010/0302072 A1 * | 12/2010 | Larch | ..................... | B64D 47/02 340/945 |
| 2016/0049053 A1 * | 2/2016 | Simmons | ............... | G08B 7/066 340/815.4 |
| 2016/0123741 A1 * | 5/2016 | Mountain | ................ | H04N 5/44 701/533 |
| 2018/0098201 A1 * | 4/2018 | Torello | ..................... | G01S 13/84 |
| 2021/0158664 A1 * | 5/2021 | Correnti | ................. | G01K 1/024 |
| 2021/0311133 A1 * | 10/2021 | Oosugi | ..................... | G05D 1/02 |
| 2021/0325188 A1 * | 10/2021 | Nanda | .................. | G01C 21/206 |
| 2021/0325505 A1 * | 10/2021 | Cincotta | .................... | G01S 5/16 |
| 2021/0349066 A1 * | 11/2021 | Chilla | .................. | G01N 33/004 |
| 2021/0364296 A1 * | 11/2021 | Liu | ..................... | G01C 21/1656 |

* cited by examiner

*Primary Examiner* — Gerald J Sufleta, II
(74) *Attorney, Agent, or Firm* — Kenneth L Tolar

(57) ABSTRACT

An emergency lighting system includes a controller in communication with ambient sensors for identifying the existence and location of a fire, explosion, or other hazardous event. The controller is also in communication with multiple light modules strategically positioned about the property. Upon detecting the existence and location of the event, the controller activates a first set of discretely colored lights to identify the event location and a second set of discretely colored lights that identify one or more recommended escape paths for the occupants. The system further activates a third set of discretely colored lights that identify vulnerable areas proximal the hazardous event and a fourth set of discretely colored lights that identify triage areas for medical treatment.

20 Claims, 6 Drawing Sheets

EMERGENCY LIGHTING SYSTEM

CROSS REFERENCE TO RELATED APPLICATIONS

None.

BACKGROUND OF THE INVENTION

The present invention relates to an emergency lighting system that quickly and safely directs property occupants away from a hazardous occurrence.

DESCRIPTION OF THE PRIOR ART

Building fires or explosions present dangerous challenges to trapped occupants. Quickly finding an exit path can be hindered by falling debris, airborne smoke, or unfamiliarity with the surrounding area. In most instances, unless an occupant immediately locates a safe exit path, the chance of death or serious injury is significantly increased. A trapped individual can quickly succumb to smoke asphyxiation or become trapped by collapsing structure while aimlessly searching for an exit door. Although some buildings include elevated signs designed to direct an occupant to an emergency exit, they are often obscured by smoke, or collapse with surrounding support structure. Furthermore, conventional emergency-exit signs direct occupants to predetermined exit doors that may be near a fire or explosion. Depending on the location of the occupant relative to the designated emergency exit, following the signs may actually hinder an escape by directing the occupant toward the hazardous event.

Escaping a facility with an active shooter can be more treacherous and challenging. Once shots are heard, chaos ensues with people scattering in random directions to evade the shooter. Too often, people unknowingly run toward the shooter since readily determining the shooter's location according to the sound of gunfire is difficult. If the occupant follows existing emergency lighting or signage, he or she risks unwittingly engaging the shooter while exiting. Accordingly, there is currently a need for an emergency evacuation system that quickly and effectively directs an occupant away from a hazardous event, regardless of its location within a facility.

A review of the prior art reveals a few devices that purportedly address this need. For example, U.S. Pat. No. 6,646,545 to Bligh discloses a color-coded evacuation signaling system including a processor in communication with sensors that detect smoke, carbon dioxide, heat, and other similar parameters. The processor communicates with light units embedded in floors in a building. Each light unit includes a transparent cover with LEDs therein that illuminate text or symbols. Upon receipt of a distress signal from one of the sensors, the processor illuminates red LEDs to identify danger zones, green LEDs to identify safety escape paths, and amber LEDs to indicate a system fault.

U.S. Pat. No. 7,026,947 to Faltesek discloses a building-emergency path-finding system including a plurality of sensors that establish ingress paths for first responders and egress paths for evacuees. The ingress and egress paths can be identified by illuminated exit or arrow signs, strobe lights or emergency announcements that are activated during an emergency. The device may use colored, glowing conductors for identifying the paths.

International patent publication no. WO 1998038454 to Becnel discloses an emergency escape route system comprising a plurality of flares that are activated along certain routes during an emergency.

U.S. patent publication no. 2009/0066522 to Lee et al. discloses an emergency lamp system for guiding building occupants to the nearest exit, including light units that are illuminated green and red to indicate relative positions of a fire, exit doors or safe areas.

U.S. Pat. No. 7,255,454 issued to Peterson discloses an emergency lighting system.

U.S. patent published patent application no. 2016/0123741 to Mountain discloses an evacuation-route identification system including sensors for identifying an emergency event that initiate various responses, such as illuminating colored lights to identify exit or perilous paths within a dwelling.

Although Bligh and Faltesek disclose lighting systems that use colored lights to direct an occupant toward an exit, they have several deficiencies. Bligh discloses light modules embedded within a floor, which are laborious and costly to install. Moreover, lighted paths formed on a walkway are difficult to see in the presence of smoke or falling debris. Furthermore, the lighted path in an adjacent room may be obstructed by a wall or door, causing an occupant to unknowingly enter a room where the dangerous event is occurring. If the event is extremely volatile, e.g., one involving an active shooter or a bomb threat, an occupant could unknowingly encounter the event while trying to escape. Finally, a guide path at ground level prevents an evacuee from focusing straight ahead and avoiding obstacles, hazards, or other dangers.

The patent to Faltesek only discloses colored, glowing conductors mounted on a wall or ceiling that power lighted exit signs. As with Bligh, the colored conductors may be difficult to see in the presence of smoke or falling debris. Wall-mounted guides are also destroyed or disabled when walls collapse. The lighted guides likewise require the occupant to focus on specific elevated areas other than potential obstacles in the escape path. Furthermore, none of the prior art devices simultaneously identify triage areas for medical response personnel to safely treat injured building occupants.

The present invention overcomes the disadvantages of the prior art by providing an emergency lighting system that activates discretely colored lights that illuminate an entire room or area to clearly convey the area's status. Therefore, an evacuee is not required to focus on a particular location to determine the status of the general area. Moreover, the system simultaneously activates a discretely colored light remote from the identified hazardous event to designate a triage area for emergency-response personnel to treat injured evacuees.

SUMMARY OF THE INVENTION

The present invention relates to an emergency lighting system for a heavily occupied property, such as an industrial plant, a warehouse, an office building, a restaurant, a school, or a similar facility. The lighting system includes a controller in communication with heat detectors, smoke detectors and possibly other similar ambient sensors for identifying the existence and location of a fire, explosion, or other hazardous event. The controller is also in communication with the facility's existing environmental lights and multiple light modules strategically positioned about the property. Upon detecting the existence and location of the event, the controller activates a first set of colored lights to identify the event location and a second set of colored lights that identify one or more recommended escape paths for the occupants. The system further activates a third set of colored lights that identify vulnerable areas proximal the hazardous event, or those containing combustibles or explosives, where the fire can quickly spread. Finally, the controller activates a fourth set of discretely colored lights that identify areas on the property where first responders can safely establish a triage to render emergency medical care to evacuees.

It is therefore an object of the present invention to provide an emergency lighting system that directs property occupants away from a hazardous event.

It is therefore another object of the present invention to provide an emergency lighting system that automatically illuminates multiple sets of discretely colored lights to identify danger zones, vulnerable zones, and safe zones during an emergency event.

It is yet another object of the present invention to provide an emergency lighting system that automatically illuminates discretely colored lights upon an ambient sensor detecting an emergency event.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
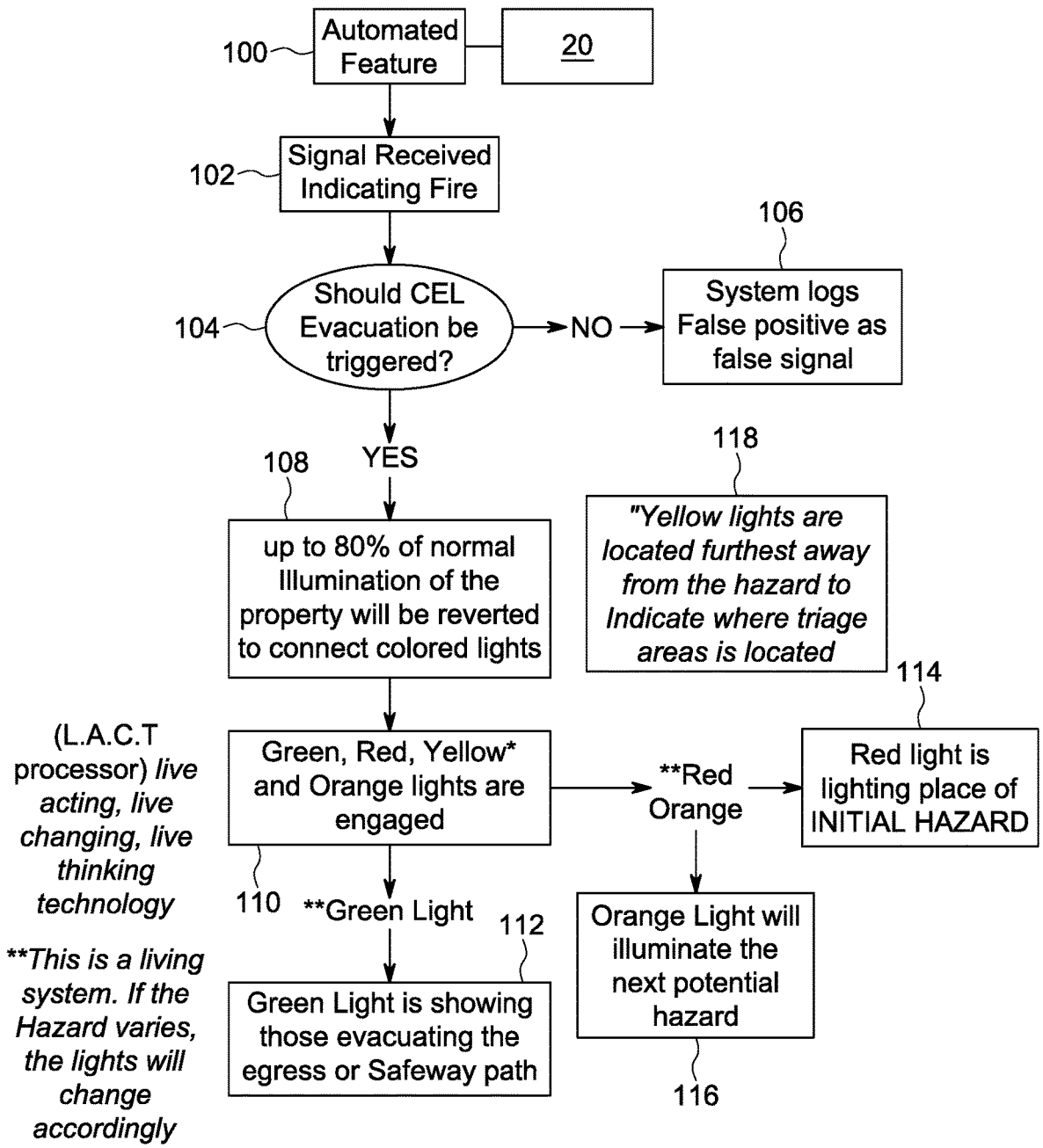
FIG. 1 is a block diagram of the automated emergency lighting system according to the present invention.
Figure 3:
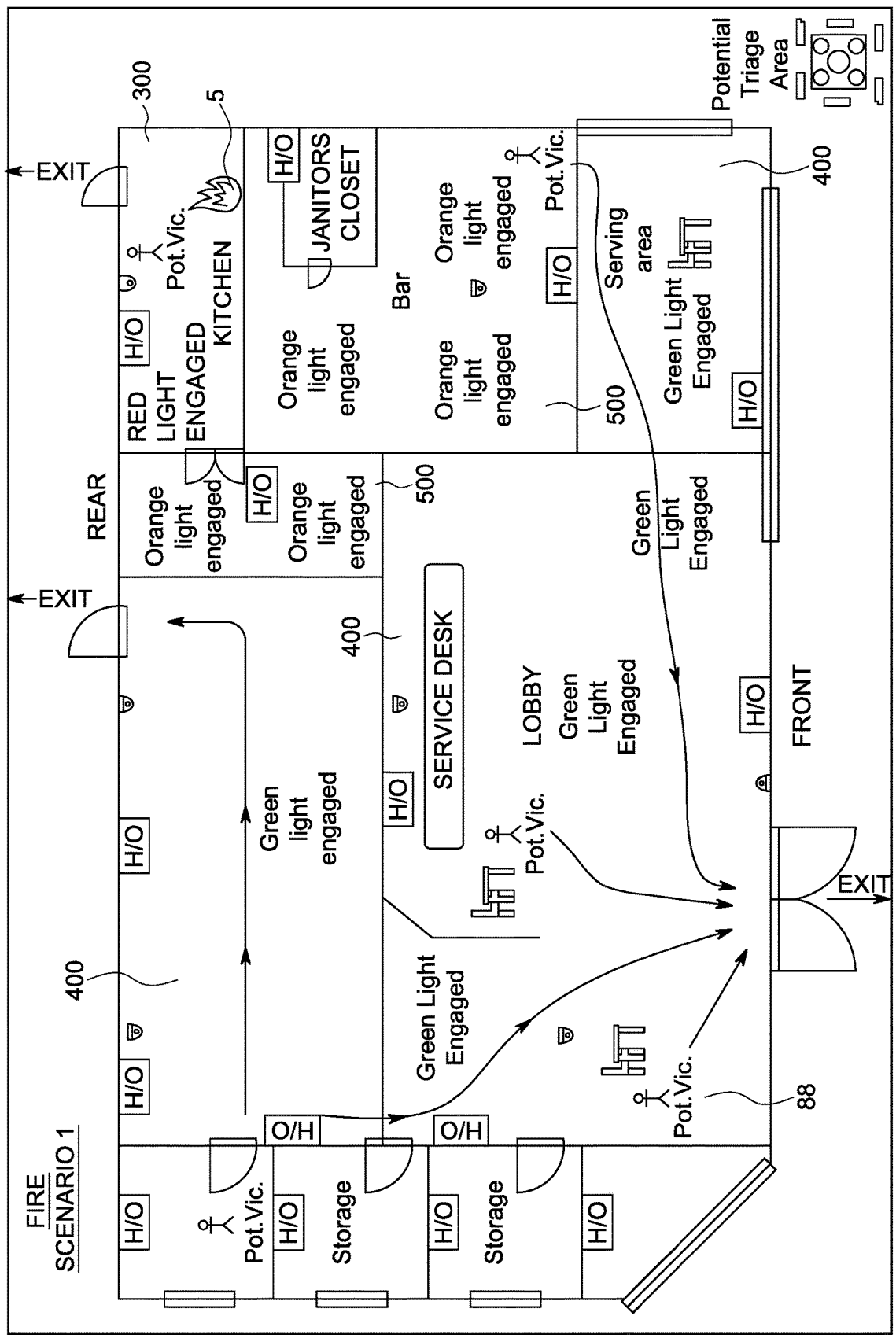
FIG. 3 is a diagram of the automated emergency lighting system installed within an indoor facility, such as a restaurant.
Figure 4:
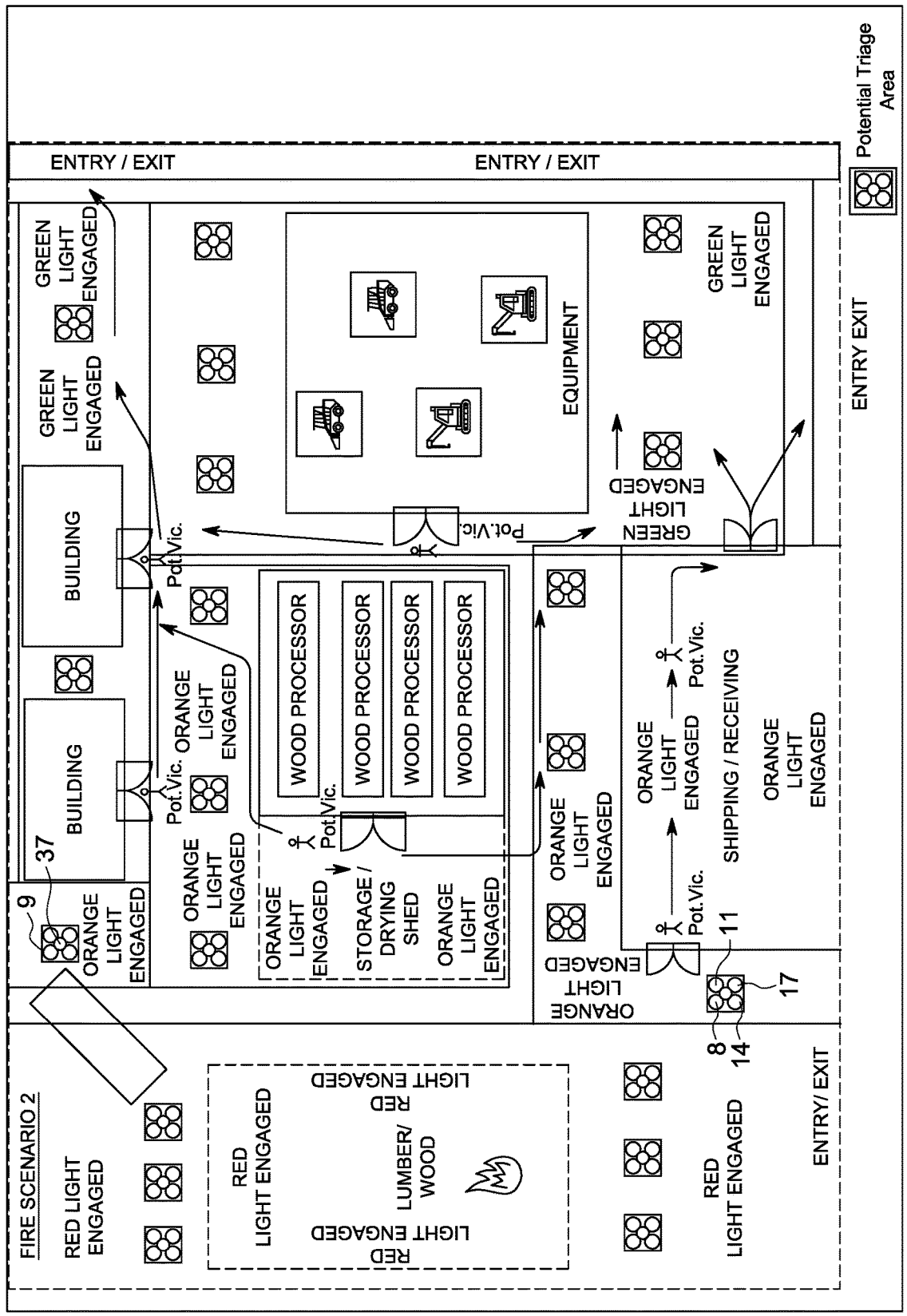
FIG. 4 is a diagram of the automated emergency lighting system installed within an outdoor facility.

The present invention relates to an emergency lighting system for a given property, such as an industrial plant, a warehouse, a restaurant, a school, or a similar heavily occupied facility. Referring specifically to FIGS. 1, 3 and 4, an automated lighting system for identifying and responding to fires or explosions includes a controller 100 in communication with heat detectors, smoke detectors or other similar ambient sensors 20 to identify a danger zone 300 representing the location of the fire 5, explosion, or similar hazardous event. Various temperature sensors inform the controller of the temperature of the fire and the surrounding atmosphere to further assist with an appropriate response. The controller includes specifically configured software that performs all the inventive steps described herein. Upon detecting the existence and location of the event according to an alarm signal from a given sensor, the controller identifies safe zones 400 to establish one or more recommended escape paths for the occupants 88. The controller then identifies vulnerable zones 500 that are either proximal the hazardous event, and/or contain combustibles or explosives that can quickly ignite if the fire spreads. Finally, the controller identifies one or more treatment zones 600 on the property where first responders can safely establish a triage to render emergency medical care to evacuees.

The controller is also in communication with multiple light modules 9 strategically positioned about the property. Each light module 9 includes a housing or casing containing the facility's existing white environmental light 37 surrounded by a plurality of discretely colored lights. For example, a module 9 positioned within a building interior includes at least a red light 8, a green light 14 and an orange light 17 while an outdoor module further includes a yellow light 11 for the reasons described in more detail below. The light module is mounted in a similar location as the existing environmental light, i.e., on the ceiling or an upper portion of the wall to illuminate the entire surrounding area. Accordingly, each light is a bulb, lamp, large LED or similar element capable of illuminating an entire room or a large area. When a potential hazardous event is indicated by receipt of a signal 102 from a given sensor, the controller first determines 104 whether the signal was generated by a false alarm. If so, the controller records the event 106 as such and returns to a dormant state. If the controller determines that the hazardous event is authentic, it disables 108 most of the existing lights 37 to eliminate shadows that would otherwise cause disorientation and confusion among the responders and evacuees. Shadows also hinder firefighters' ability to aim fire hoses and other fire extinguishing equipment.

The controller also illuminates 110 a select number of the discretely colored lights to direct occupants 7 away from the hazard. The system illuminates 114 the red light 8 within one or more light modules 9 to identify the danger zone 300 for evacuees 7 to avoid, and which identifies the location of the hazardous event for response personnel. The system also activates 112 the green light 14 within one or more light modules 9 to identify safe zones 400 having recommended exit doors or escape paths. The system further activates 116 the orange light 17 within one or more light modules 9 to clearly identify vulnerable zones 500 that are immediately adjacent the danger zones 300, and/or which contain explosives or combustibles. The controller includes a database of ignition temperatures of any stored materials to assist with identifying vulnerable zones. Sensors also measure wind speed and direction to further analyze a fire's spread potential relative to any stored materials. Finally, the system activates 118 the yellow light 11 within one or more light modules 9 to identify a treatment zone 600 for responding medical personnel to establish triages. The light modules having a yellow light 11 are positioned in outdoor areas that are likely to be farthest from a potential emergency event, i.e., an outdoor parking lot, a playground, a tennis court, etc. The controller and associated software can calculate the area of the designated safe, vulnerable and danger zones. Moreover, the controller assumes control over all emergency response procedures, including contacting emergency personnel, activating fire sprinklers only in certain areas or rooms, and which environmental lights should be deactivated. The power source of the lighting system is separate and remote from the facility's power source so as not to be affected by the emergency event. If necessary, the power source can be buried beneath the facility. Therefore, the system's power source will not be destroyed by fire or explosion or flooded by a firefighter's water hoses.

Figure 2:
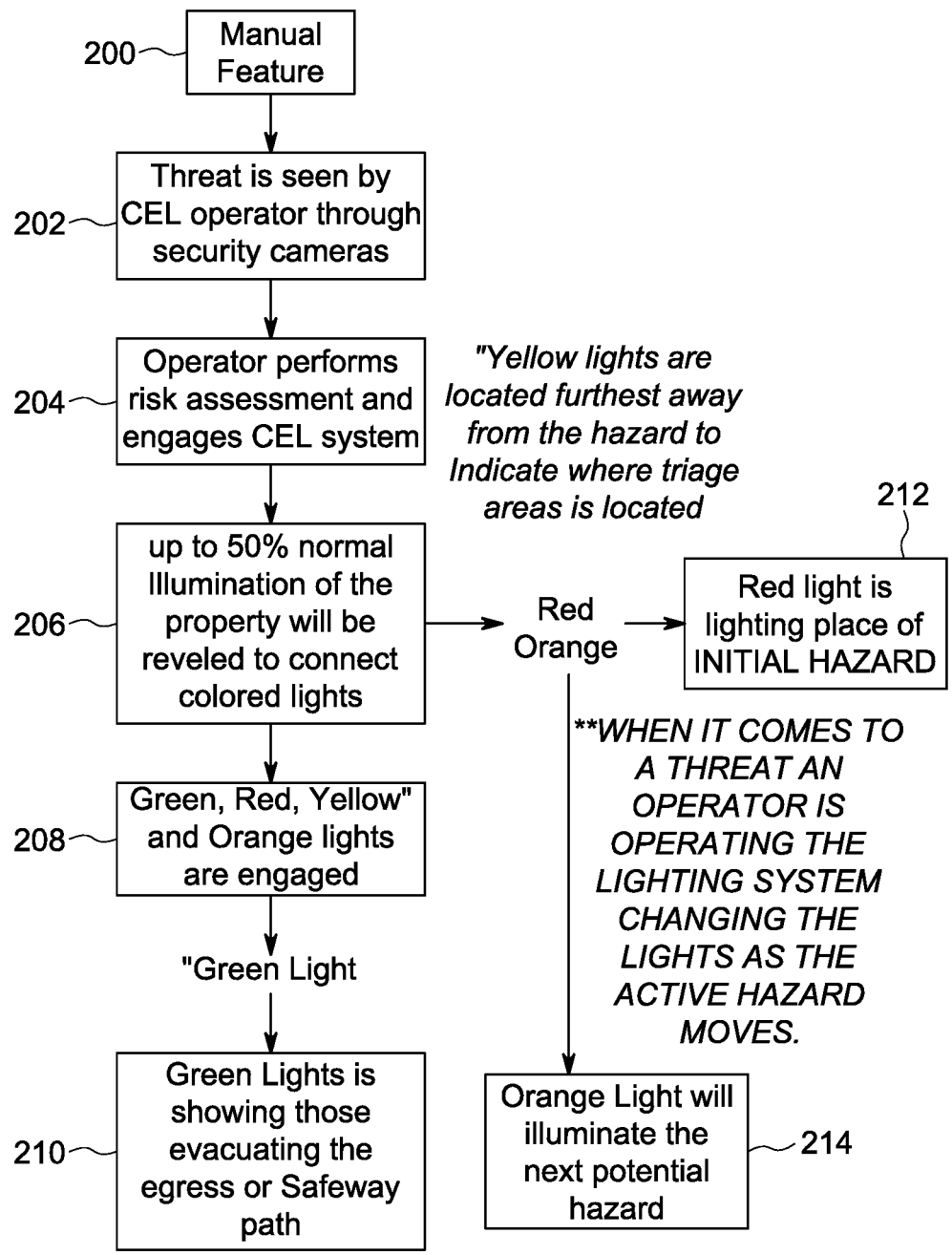
FIG. 2 is a block diagram of the manually activated emergency lighting system according to the present invention.
Figure 5:
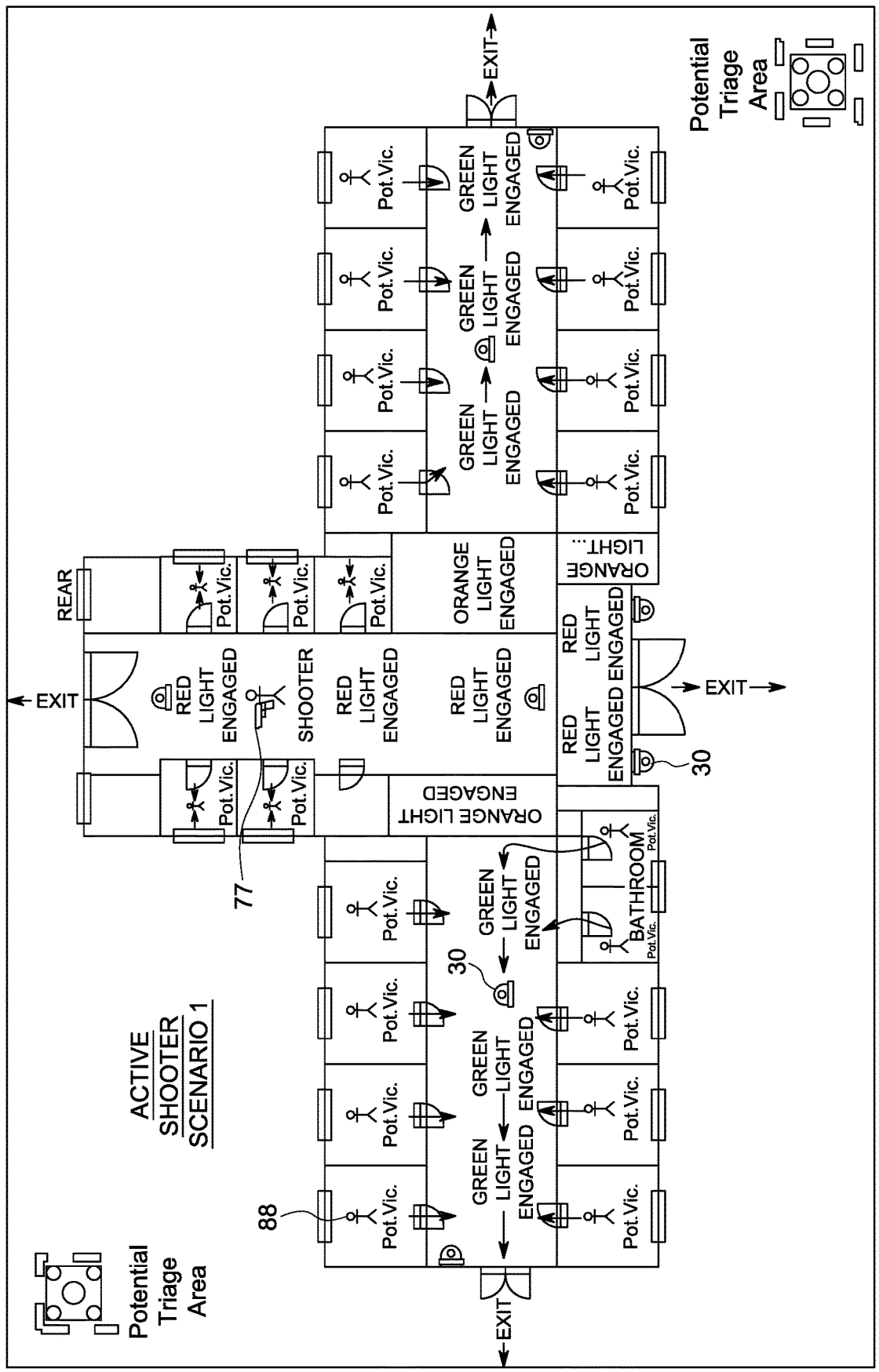
FIG. 5 is a diagram of the manually activated system installed within an indoor facility.
Figure 6:
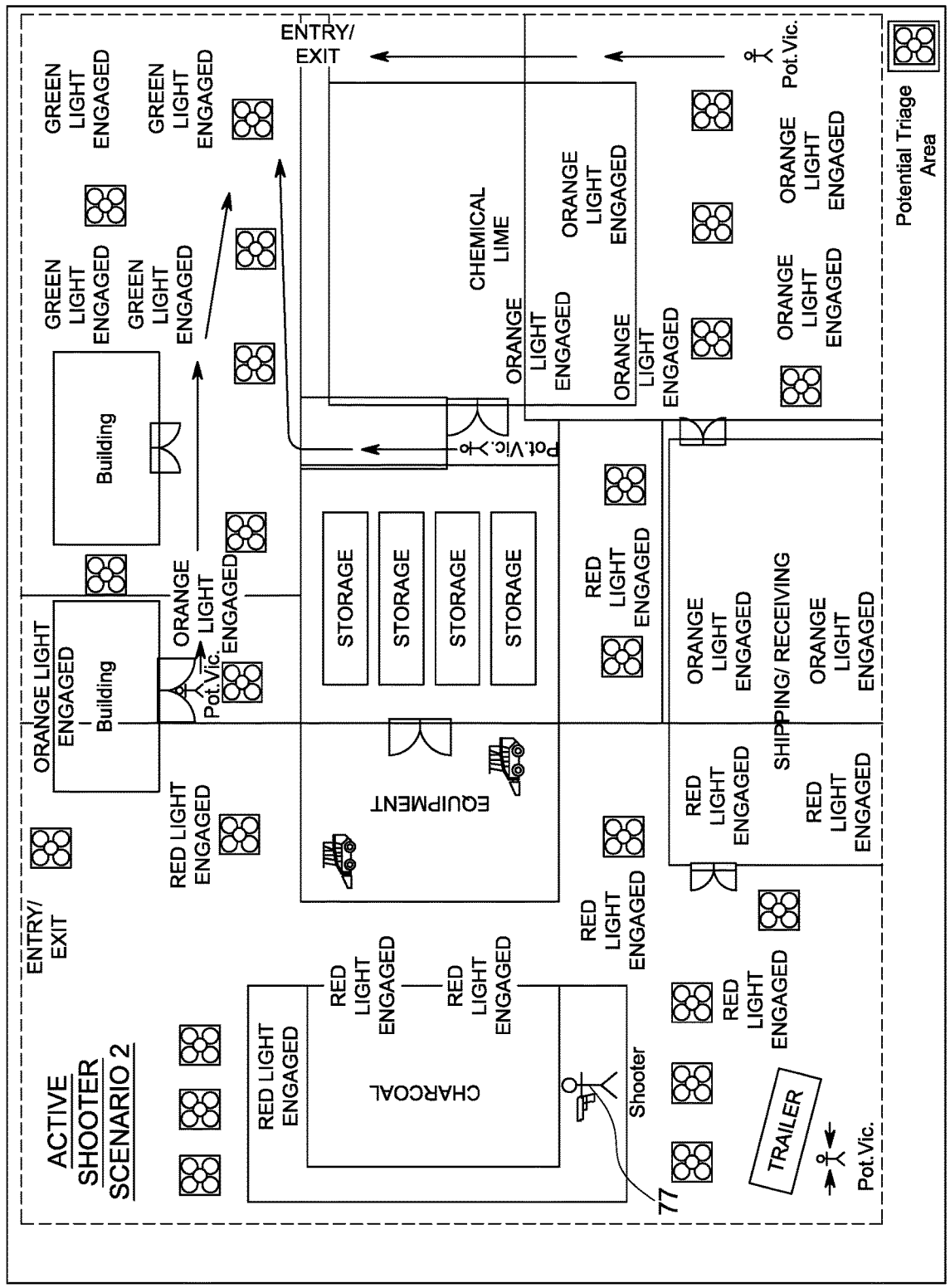
FIG. 6 is a diagram of the manually activated system installed within an outdoor facility.

Now referring to FIGS. 2, 5 and 6, a manually activated system includes a supervisor or operator who continuously monitors a designated area, i.e., a building interior and/or exterior, using security cameras 30. When observing an unsafe condition, i.e., a possible shooter 77, a security breach, a suspicious or unattended package or any other potential threat, the supervisor initiates 204 the lighting system by engaging a predetermined command that communicates the location of the threat to the controller. The controller then disables 206 a substantial portion of the existing facility lighting 37 and activates 212 the red lights 8 in the area where the threat exists. The orange lights 17 are illuminated 214 to identify any areas adjacent to or threatened by the hazardous event to alert those in the vicinity that the threat is nearby. Green lights 14 are illuminated 210 to identify the areas offering a safe area to retreat or escape. Finally, yellow lights within predetermined light modules are activated 218 to identify remote triage areas for medical responders to treat injured or wounded victims. The operator can also track the shooter as he or she moves around the property to transmit the location information to a smart phone or laptop to allow response personnel to also track the perpetrator.

As readily apparent from the above description, the present invention provides an emergency lighting system that immediately and conspicuously identifies hazardous, vulnerable, and safe zones within an area where a hazardous event has occurred. By using instinctual colors like green, red, and orange, the system requires little or no training to educate occupants or responders as to the meaning or significance of the lighted areas when escaping a disaster. People instinctively associate red with danger, orange with caution and green with safety. Accordingly, both occupant and emergency-responder reaction is much more effective, orderly and cohesive.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An emergency lighting system comprising:
a plurality of light modules positioned within an occupied facility, each of said light modules including a plurality of discretely colored lights, each of said discretely colored lights projecting a discretely colored light beam to indicate a predetermined status; each of said discretely colored lights capable of illuminating an entire room so as to be usable as a standalone light source;
a plurality of ambient sensors positioned within said occupied facility for detecting a hazardous event;
a controller in communication with said ambient sensors and said light modules, said controller configured determine a location of said hazardous event upon receiving an alert signal from one of said sensors; said controller activating a select number of said discretely colored lights according to the location of the hazardous event.

2. The emergency lighting system according to claim 1 wherein said plurality of discretely colored lights include at least one green light, one orange light and one red light.

3. The emergency lighting system according to claim 2 wherein said plurality of discretely colored lights further include a white light for illuminating a surrounding environment whenever a hazardous event is not detected.

4. The emergency lighting system according to claim 3 further comprising a means for disabling the white light in a predetermined number of light modules upon detection of the hazardous event to eliminate shadows that hinder responders and facility occupants.

5. The emergency lighting system according to claim 1 wherein said light modules are positioned and configured to provide ambient light that enables facility occupants and responders to readily see in the absence of other light sources.

6. The emergency lighting system according to claim 1 wherein said controller simultaneously activates the green light in a first predetermined number of light modules to designate a safe zone, the orange light in a second predetermined number of light modules to designate a vulnerable zone and the red light in a remaining number of light modules to designate a danger zone.

7. The emergency lighting system according to claim 1 wherein said controller is a supervisor monitoring a plurality of security cameras positioned within said facility.

8. The emergency lighting system according to claim 6 wherein said controller designates areas proximal said hazardous event as the vulnerable zone and the location of the hazardous event as the danger zone.

9. The emergency lighting system according to claim 8 wherein said controller determines recommended escape routes according to the location of the hazardous event and designates the recommended escape route as the safe zone.

10. The emergency lighting system according to claim 3 where each of said light modules includes a casing having said white light, said orange light, said green light and said red light received therein.

11. The emergency lighting system according to claim 2 wherein said plurality of discretely colored lights further include a yellow light to designate a triage area.

12. The emergency lighting system according to claim 11 wherein said controller activates the yellow light in a light module that is remote from said hazardous event.

13. The emergency lighting system according to claim 1 wherein said light modules are positioned on a ceiling or an upper portion of a wall to illuminate a surrounding area and to provide ambient light that enables facility occupants and responders to readily see in the absence of other light sources.

14. The emergency lighting system according to claim 6 wherein said controller designates an area remote from said hazardous event a triage area and illuminates said triage area with a yellow light.

15. The emergency lighting system according to claim 6 wherein said controller includes a database of ignition temperatures of materials stored within said occupied facility to assist with identifying vulnerable zones.

16. The emergency lighting system according to claim 6 further comprising sensors for measuring wind speed and direction to further analyze a fire's spread potential relative to any stored materials.

17. The emergency lighting system according to claim 2 wherein said plurality of discretely colored lights further include a yellow light in light modules that are positioned in outdoor areas that are likely to be farthest from a potential emergency event to designate a triage area.

18. The emergency lighting system according to claim 6 wherein said controller can calculate an area of said safe zone, said vulnerable zone and said danger zone.

19. The emergency lighting system according to claim 4 wherein said controller, said light modules and said sensors are powered with a dedicated power source that is independent from a power source used by said occupied facility.

20. The emergency lighting system according to claim 19 wherein said dedicated power source is buried beneath the occupied facility so as not to be impacted by fire, explosion or water.

\* \* \* \* \*